United States Patent [19]
Quarendon

[11] Patent Number: 4,858,149
[45] Date of Patent: Aug. 15, 1989

[54] METHOD AND SYSTEM FOR SOLID MODELLING

[75] Inventor: Peter Quarendon, Romsey, United Kingdom

[73] Assignee: International Business Machines Corporation, Armonk, N.Y.

[21] Appl. No.: 86,763

[22] Filed: Aug. 18, 1987

[30] Foreign Application Priority Data

Sep. 3, 1986 [GB] United Kingdom ................ 8621257

[51] Int. Cl.⁴ .......................................... G06F 15/626
[52] U.S. Cl. .................................... 364/522; 340/723; 358/22
[58] Field of Search ....................... 364/521, 522, 518; 340/723, 853, 700, 720, 732; 358/22, 75, 166, 104, 955

[56] References Cited

U.S. PATENT DOCUMENTS

| | | | |
|---|---|---|---|
| 4,396,988 | 8/1983 | Fitzgerald, Jr. | 364/521 |
| 4,463,372 | 7/1984 | Bennett et al. | 358/22 |
| 4,472,732 | 9/1984 | Bennett et al. | 358/22 |
| 4,615,013 | 9/1986 | Yan et al. | 358/104 X |
| 4,625,289 | 11/1986 | Rockwood | 364/522 |
| 4,737,921 | 4/1982 | Goldwasser et al. | 340/723 X |

FOREIGN PATENT DOCUMENTS 938957 10/1963 United Kingdom .
1116543 6/1968 United Kingdom .
1187378 4/1970 United Kingdom .

OTHER PUBLICATIONS

"Reducing the Effect of Complexity on Volumn Model Evaluation", Computer Design, vol. 14, No. 2, Woodwark & Quinlan.
"Global and Local Deformations of Solid Primitives", Computer Graphics, vol. 18, No. 3, Jul. 1984, Alan Barr.

Primary Examiner—M. H. Paschall
Assistant Examiner—A. Jonathan Wysocki
Attorney, Agent, or Firm—George E. Clark

[57] ABSTRACT

A method of generating a spatial representation of a 3-D solid object, which includes component shapes, which can be defined by transforming constructive solid geometry primitives includes the steps of, setting up a structure, to define the object in terms of the primitives and transforms setting up a definition of a 3-D box in a world space and then sub-dividing the box into sub-boxes, generating test-cells in object space by performing on the sub-boxes the inverse of each transformation to be performed on the primitives to create the object and determining which of the test-cells intersect the object. Thus, the need to transform the object primitives is avoided. A particular application of the method is the generation of 2-D images of a 3-D solid object.

10 Claims, 4 Drawing Sheets

METHOD AND SYSTEM FOR SOLID MODELLING

BACKGROUND OF THE INVENTION

The present invention relates to a method of generating a spatial representation of a three-dimensional solid object and to a solid modelling system for performing such a method.

Objects may be represented in a graphics processing system using various techniques. One which is particularly suitable for representing solid objects is "Constructive Solid Geometry" (CSG). In accordance with this technique a three-dimensional (3-D) solid object is represented by a functional definition identifying the set of points which lie within the object. Typically, the object is defined by a Boolean function which returns a "true" if applied to a point within the object and returns a "false" otherwise. This technique contrasts with, for example, line drawing techniques where the edges and surfaces of an object are defined rather than its volume.

The functional definition of an object effectively defines the set of points which make up the object. The functional definition of a sphere, for example, defines the set of points lying within a given radius of a center point. Composite objects are defined by combining the functional definitions of constituent basic objects, or "primitives", e.g. spheres, infinite planes, infinite cylinders. The functional definition of a dumb-bell, for example, would comprise the functional definition of each of two spheres at different positions, the functional definition of an infinite cylinder whose axis passes through the centers of the spheres and the functional definitions of two planar half-spaces which truncate the cylinder at the spheres, the functional definitions of the spheres, the cylinder and the planar half-spaces being combined using set union and intersect operators (i.e. using set theory principles). Primitives can also be combined using other combinational operators such as set subtracting operators to define, for example, a composite object with a cut-out or hole. In this way hollow composite objects can be defined by subtracting a smaller object from a larger one. Such composite objects are still "solid" within the meaning of this application because the individual object definitions which make up the composite object are solid.

A composite object formed from primitives can be structured in a number of ways. However it is usual to use a tree structure with the composite object being defined at the root of the tree, the primitives being defined at the leaves and operators being defined at nodes in the tree to identify the combinational operations to be performed to construct the object from the primitives and/or sub-objects defined at lower-order nodes in the tree.

The range of shapes which can be defined in this way is, in practice, dependent on the set of primitives chosen. In many prior systems, objects are constructed only from planar half-spaces. A planar half-space is a functional definition of an infinite object which exists on one side of a plane. The functional definition of a cube is, for example, defined by combining the functional definitions of six half-spaces using the set intersection operator. Other systems have also been implemented using cylinders, spheres, tori, ellipsoids and even helices.

Some shapes still cannot be defined exactly, however, using these techniques. Examples are an egg shape (which is essentially a tapered sphere), a helix with a box-shaped cross section, or a double-coiled helix. These have conventionally been approximated, often with great difficulty, from simpler shapes, normally planar half-spaces.

DESCRIPTION OF THE PRIOR ART

It has been suggested to generate significant class of such shapes by applying transformations to existing primitives. For instance, an egg shape could be produced by applying a tapering transform (one where the scale factor varies along one of the axis) to a sphere. A cylinder could be turned into a helix by using a transform to twist it about an axis. Samples of such transforms are given by Alan Barr in "Computer Graphics", Volume 18, No. 3, pages 21-30. Even using the techniques described in this article, however, it is only possible to generate effective representations of a relatively simple class of objects.

By effective representations is meant a representation which can, in practice, be subjected to processing in order to produce a useful result. The result of processing can take many forms. It is often desired to generate a two-dimensional (2-D) image of the object. It may be necessary to calculate critical data relating to an object such as volume, center of mass, moment of inertia and surface area. It may also need to be known whether two objects co-occupy a region of space at any particular time, for example for robotic control.

In order to process the functional definition of an object, a technique called spatial subdivision is frequently employed. This technique, as applied to a method of generating a 2-D perspective view of a 3-D solid object, is described by Woodwark and Quinlan in their paper entitled "Reducing the Effect of Complexity on Volume Model Evaluation" which was published in March, 1982 in "Computer Design", Volume 14, No. 2. Their method can be summarized as follows:

The object to be rendered is transformed from world space into perspective viewing space. This perspective representation of the object is then enclosed in a box. A test is made to find whether the box intersects this object. If it does, the box is subdivided into eight equal sub-boxes, dividing each square face into four smaller rectangles. These smaller rectangular boxes are then tested in turn and any of which are empty are discarded. Those which contain part of the object are kept and subdivided again and the process is repeated until the rectangular boxes are sufficiently small to correspond with single screen pixels. These pixels are then colored appropriately on the screen.

This prior method works well in principle, as long as the object to be rendered can be easily defined in both world space and perspective viewing space—if the object has, for example, flat surfaces. In the case of objects with a very complex shape, however, the functional definitions of the objects become so unmanageable that their method is impractical.

Although Woodwark and Quinlan's article describes a method of generating a two-dimensional image of a 3-dimensional solid object using a spatial subdivision method there is, however, no suggestion of how a complex object may be defined using transforms and primitives, whether for the generation of images, or otherwise.

There is developing a need to model very complex objects indeed in fields as diverse as medicine and robotics, for example. In the medical field it would be useful, for example, to be able to easily generate accurate 3-D representations of organs such as the heart, and many other parts of the body such as blood vessels from x-ray and other such data, for planning intricate surgery. In the robotics field, there is a need, for example, to model machined parts as accurately as possible in order to improve machining and assembly processes.

Thus, the objects which it is now desired to model are of a degree of complexity which cannot adequately be handled using prior techniques. As an example, consider the problems involved in modelling a network of blood vessels using primitives in the form of infinite cylinders. It may be necessary to perform any combination of truncating, twisting (about the axis), bending, sheering, scaling, transformation and joining operations. The prior art does not teach how representations of such complex models may be generated which can be processed in an effective way.

SUMMARY OF THE INVENTION

The present invention seeks, therefore, to provide an improved modelling technique based on the principles of constructive solid geometry which enables spatial representations of complex objects to be generated in an easy and effective manner.

In accordance with a first aspect of the present invention, there is provided a method of generating a spatial representation of a three-dimensional solid object in a system comprising storage and processing means, the method comprising:

(a) the initial step of establishing in storage
a structure for defining the object, the structure including the functional definitions of at least one primitive and at least one transform operator; and
a functional definition of a three-dimensional box defining world space;
(b) followed by the step of
subdividing the box in world space into progressively smaller sub-boxes until sub-boxes are created whose size corresponds to at least a desired resolution and
for at least one primitive in the structure, traversing the structure to identify whether any transform operators are to be applied to the primitive as defined by the structure, and, if so, generating test-cells in primitive space from the sub-boxes using the inverse of the or each transform operator so identified and determining whether sub-boxes having the desired resolution have corresponding test-cells which intersect the primitive, or not, whereby a spatial representation of the object may be generated without performing transform operations on the object or the component primitives thereof.

In accordance with a further aspect of the present invention, there is also provided a method of generating a spatial representation of a three-dimensional solid object in a system comprising storage and processing means, the method comprising:

(a) the initial step of establishing in storage
a structure for defining the object, the structure including the functional definitions of a plurality of primitives and a plurality of transform operators; and
a functional definition of a three-dimensional box defining world space;
(b) followed by the step of subdividing the box in world space into progressively smaller sub-boxes until sub-boxes are created whose size corresponds to at least a desired resolution and
for a given sub-box and a given primitive in the structure traversing the structure to that primitive to identify whether any transform operators are to be applied thereto as defined by the structure, and, if so, generating a test-cell in primitive space from the given sub-box using the inverse of the or each reach transform operator so identified and determining whether the sub-box has a corresponding test-cell which intersects the primitive, whereby a spatial representation of the object may be generated without performing transform operations on the object or the component primitives thereof.

In accordance with yet a further aspect of the present invention, there is also provided a solid modelling system comprising means for generating a spatial representation of a three-dimensional solid object, said means for generating a functional representation of the transform of the object including:

object definition means for storing a structure defining the object, the structure including at least one primitive and at least one transform operator;
world space definition means for storing a functional definition of a three-dimensional box defining world space; and
processing means
for subdividing the box in world space into progressively smaller sub-boxes until sub-boxes are created whose size corresponds to at least a desired resolution, and
for at least one primitive in the structure, for traversing the structure to determine whether any transform operators are to be applied to the primitive as defined by the structure and, if so for generating test-cells in primitive space from sub-boxes using the inverse of the or each transform operator so identified, and for determining whether sub-boxes having the desired resolution have corresponding test-cells which intersect the primitive, or not.

The Applicants' co-pending application of even date (IBM Docket Number UK985-004) relates to the generation of two dimensional images only of a transform of a three-dimensional solid object. The present invention on the other hand is concerned with the generation of a spatial representation (which could be a 2-D image, but is in the most general case purely a representation is spatial terms of an object which can be used to perform, for example, mass calculations) of objects which cannot be defined directly in terms of primitives.

The foregoing and other objects, features and advantages of the present invention will be apparent from the following, more particular description of a preferred embodiment of the invention as illustrated in the accompanying drawing.

DESCRIPTION OF A PREFERRED EMBODIMENTS OF THE INVENTION

Figure 1A:
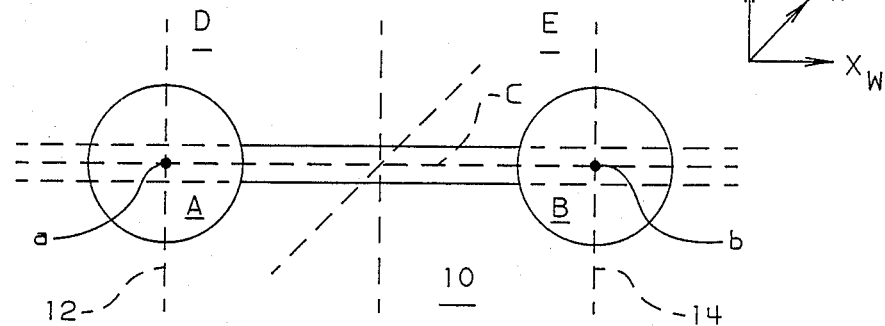
FIGS. 1A, 1B and 1C illustrate the principles of constructive solid geometry as known in the prior art.
Figure 1B:
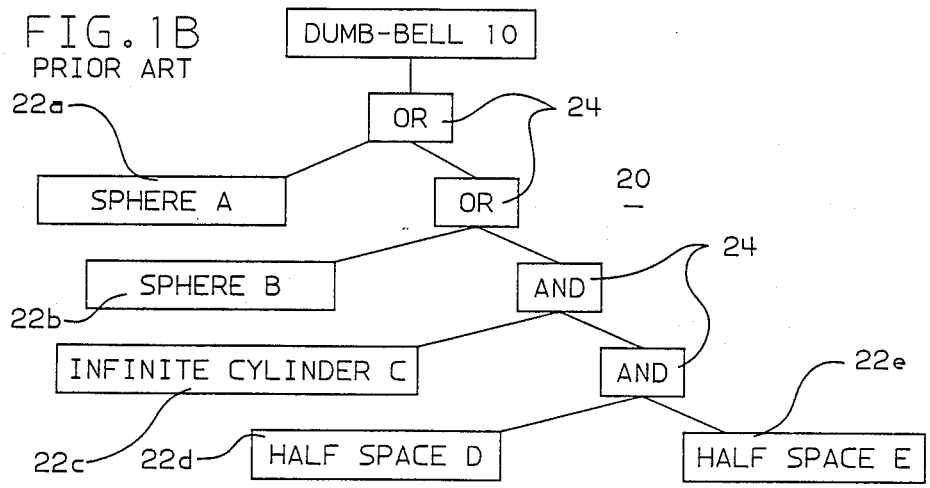
Figure 1C:
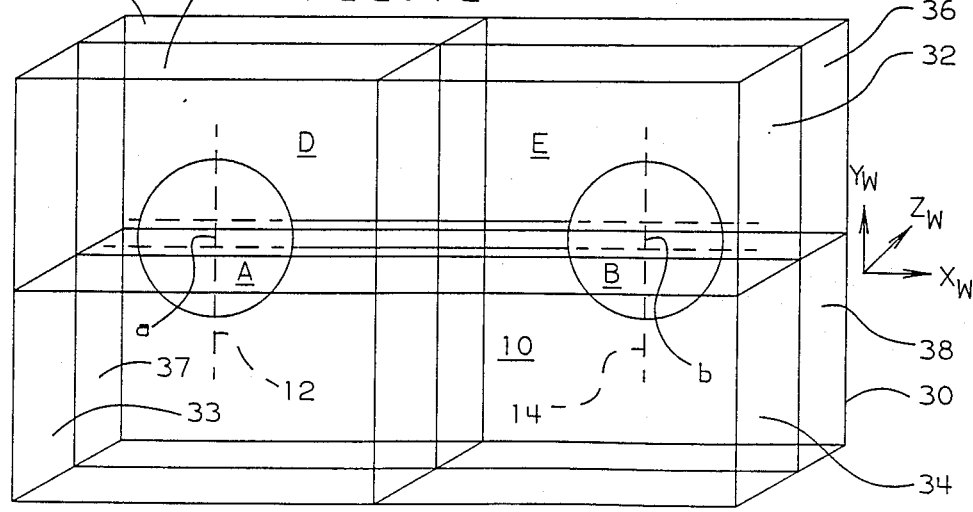

Before describing the present invention in detail it is perhaps useful to discuss the principles of evaluating a functional definition of an object using CSG with reference to FIGS. 1A, 1B and 1C.

In general terms, the evaluation of a solid model is the process of determining inside and outside and thus the boundaries of the solid. The most common use of the evaluation process is to draw a 2-D picture of the object but it can also be used to compute the mass properties such as volume or center of gravity, to determine the surface area of the object and so on.

Conventionally, an object is defined in accordance with the principles of constructive solid geometry in terms of a tree structure such a that shown in FIG. 1B.

FIG. 1A is an illustration of a dumb-bell such as that mentioned earlier. FIG. 1B illustrates a tree structure representing the dumb-bell. A practical implementation of this could be a linked-list storage structure. Mathematically, the definition of the dumb-bell could be expressed as:

$$Dumb\text{-}bell\ 10 = A + B + C*D*E$$

where "*" is the mathematical union operator represented by "AND" in FIG. 1B, "+" is the mathematical intersection operator represented by "OR" in FIG. 1B and A, B, C, D and E are the mathematical expressions for the sphere, A centered at a point, a, the sphere, B centered at a point, b, the infinite cylinder, C, the half-space, D, to the right of the line 10 and the half-space, E, to the left of the line 14. The functional definitions of the primitives A, B, C, D and E are to be found respectively at 22a, 22b, 22c, 22d and 22e in the tree structure. The mathematical operators are defined at nodes 24.

In order to perform calculations based on such a definition it is usual to employ a spatial sub-division technique as illustrated in FIG. 1C.

The basic method of spatial sub-division is as follows:

A rectangular region of space (30) is considered containing the object to be evaluated. The constructive solid geometry expression, or functional definition, which defines the object is inspected and simplified within this region of space. The simplification is not valid everywhere, but is equivalent to the original object within the region under consideration. The simplification procedure is:

1. For primitive objects, determine whether the object is completely outside the cube of space. If it is, replace the object by an EMPTY object, one which has no inside. Also determine whether the object completely encompasses the region of space. If this is so, replace the object by a FULL object—one which has no outside.

2. For compound objects made by applying set operators, recursively apply (essentially three-valued) Boolean logic to the simplified operands. For example:

| EMPTY | UNION expression2 | → | expression2 |
| expression1 | UNION EMPTY | → | expression1 |
| FULL | UNION expression2 | → | FULL |
| expression1 | UNION FULL | → | FULL |
| and | | | |
| EMPTY | INTERSECT expression2 | → | EMPTY |
| expression1 | INTERSECT empty | → | EMPTY |
| FULL | INTERSECT expression2 | → | expression2 |
| expression1 | INTERSECT FULL | → | expression1 |

If the result of this simplification is EMPTY, the object has no inside within the region under consideration. If a picture is being drawn, this region will make no contribution to the screen image. If mass properties are being computed, the region will make no contribution to the volume or moment.

If the result of the simplification is FULL, the region is completely occupied by the object. Normally, when constructing a picture from one view, this region will not contribute to the image as it does not contain a surface facing the viewer, and the inside of an object is hidden by its surfaces. For mass properties, however, the entire region will contribute to the volume or moment being computed.

Normally, the expression will contain at least one term. In some circumstances, the expression will be sufficiently simple to be treated directly. For instance it may be a single planar half-space. The contribution to the picture or mass property of the total object can be computed directly. In order to proceed in other cases, the region of space is divided into smaller regions. Most simply, it could be divided in half perpendicular to its longest dimension. FIG. 1C shows the division of the rectangular box-shaped region of space into 8 sub-boxes 31, 32, 33, 34, 35, 36, 37, 38. The simplification process is then repeated on these two new regions until expressions such as FULL, EMPTY or other simple cases are obtained.

Eventually, some lower limit on the size of regions is reached and still some regions contain non-simple expressions. When drawing a picture, a convenient stopping point is when regions have a frontal area which is smaller than or equal to that of a pixel. At this stage, regions which contain a single object will contain a pixel-sized surface of the object. Regions containing two objects will contain an edge where the two surfaces meet and regions containing three objects will normally contain a vertex.

The action depends on the calculation being performed. When drawing a picture, the surface or edge is drawn. For a surface, the surface normal is computed at the center of the region of space and this is used, in conjunction with the known positions of light sources to compute the amount of light reflected from the point toward the viewer. For a more complex edge or vertex region, a ray-tracing method can be used to isolate one visible surface to be treated in this way. When computing mass properties, the cell can simply be assumed to be half-full.

However, as has already been mentioned, although this approach works in theory, it is impractical for a large set of objects and/or transformations where the complexity of the transformed functional definitions is too high. Thus, parts of the objects cannot be defined by simple graphics primitives.

The present invention enables complex objects to be defined, which can be described by performing transforms on simple primitives and by combining the transforms and primitives. In practice, the resulting definitions would be too complex to be handled directly so, instead of transforming the component primitives of the object, space is transformed instead. The functional representation of box, say a rectangular box, is established which defines the space (world space) in which the object is to be defined. However, rather than transforming the simple primitives from their original coordinate system into world space (which is the principle of Barr's technique), the rectangular box is instead transformed through the inverse of the transformation which would conventionally have been performed on the object primitives. Thus, the rectangular box is subjected to the sub-division algorithm discussed above, but with the inverse transforms of the sub-boxes created being tested for intersection with the primitives in their original co-ordinate systems, and the need to transform the primitives themselves can be eliminated.

For example, to scale a primitive up by factors of, say, sx, sy and sz along the coordinate axes, the region of world space under consideration (i.e. a region of the space within which the object comprising the scaled down up primitive exists is transformed down by these factors and this scaled down region is compared in the "object" space in which the primitive was originally defined with the unscaled primitive.) The results are the same as testing the scaled up primitive in world space against the unscaled region of that world space.

For transforms such as scaling and translation, the scaled region remains a rectangular box to the axes after transformation. For rotation, the space remains rectangular but is no longer parallel to the axes. For transformations such as bending or twisting, the space become bent or twisted in the reverse direction and is no longer simply rectangular. It is necessary to test the object against this new, transformed, space. FIGS. 2A to 2D illustrate an example of this for the dumb-bell discussed earlier, but where the bar of the dumb-bell is bent.

The sub-division algorithm is not affected in any material way if the region of space considered is larger by some factor than it should be. All that will happen is that the expression resulting from the simplification will sometimes contain terms which, strictly speaking, could be eliminated. Provided the error is reduced as the regions under consideration get smaller, these redundant terms will reduced and it may be necessary to continue evaluation to a smaller minimum region-size but the sub-division algorithm continues to operate correctly.

The principles of the present invention will now be discussed in more detail with reference to FIGS. 2A and 2D and FIG. 3.

Figure 3:
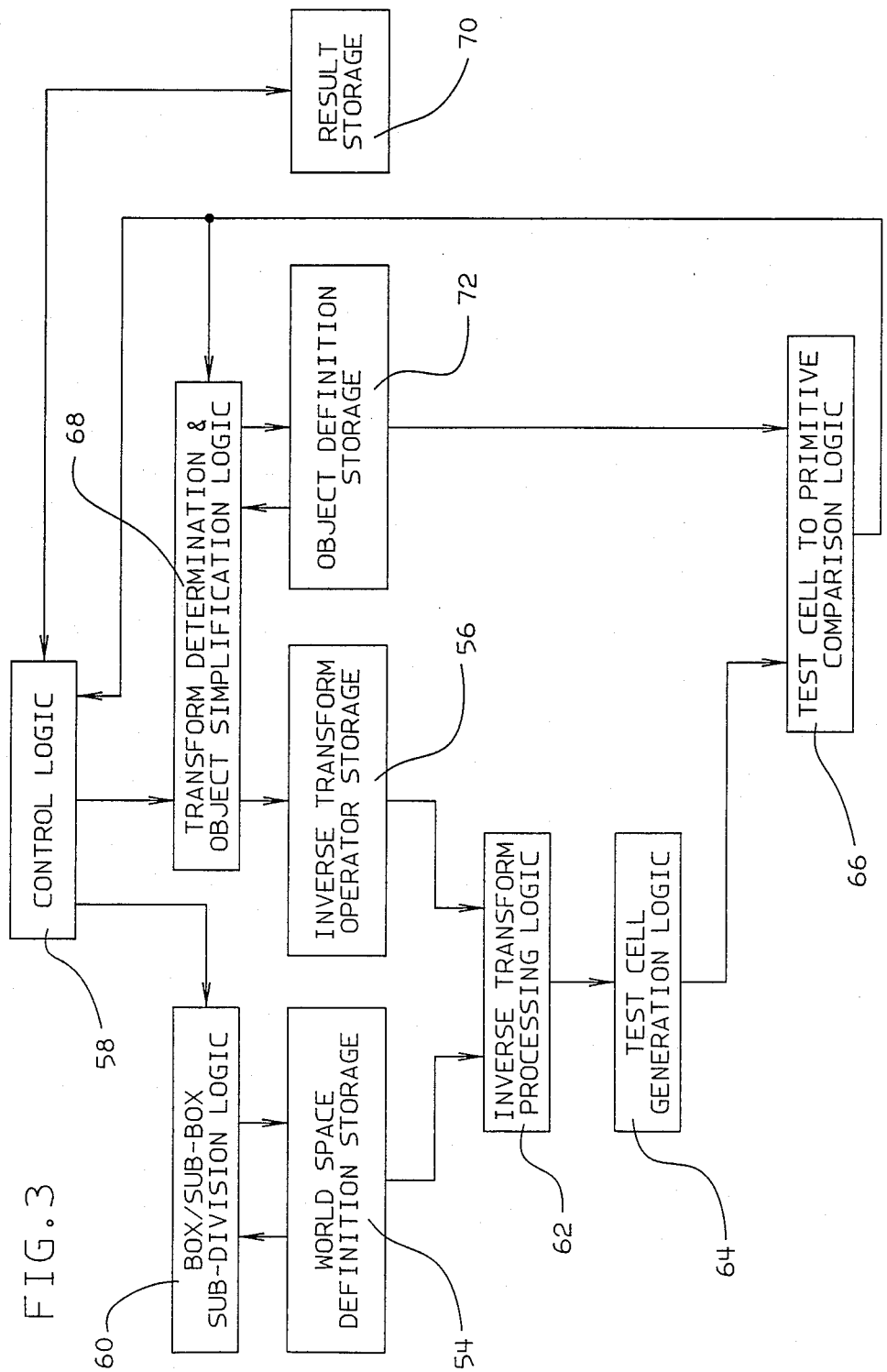
FIG. 3 is a schematic block diagram showing the interrelationship between logical and storage units of part of a solid modelling system.

FIG. 3 shows the functional organization of part of a solid modelling system such as a graphics processing system.

These functional elements could be implemented by suitably programming a conventional programmable graphics processing system. Alternatively, the functional units shown in the figure could be provided as separate hard wired circuits in a graphics processing system. Conventionally, a graphics processing system will comprise storage and processing means, and means for the input of data (e.g. a keyboard) and for the output of data (e.g. a cathode ray tube display device). The functional elements shown could, alternatively form part of the control mechanism of a robot.

Figure 2A:
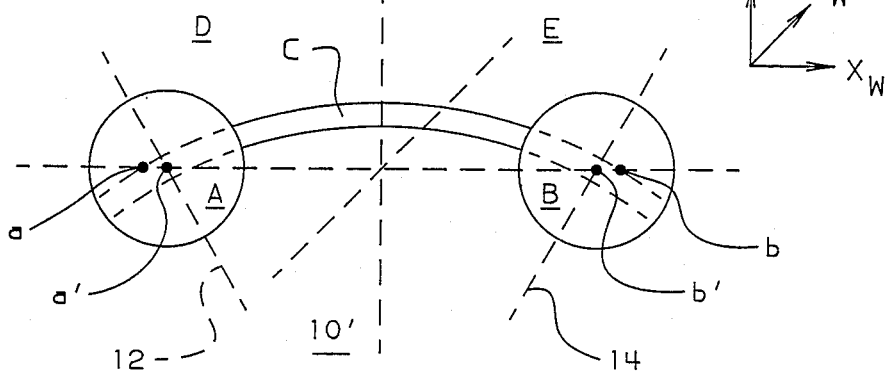
FIGS. 2A, 2B, 2C and 2D illustrate the principles of generating a spatial representation of a 3-D object in accordance with the present invention.

FIG. 2A shows a dumb-bell 10' similar to that shown in FIG. 1A, but with a bent bar.

Mathematically the definition of this dumb-bell can be represented as:

$$\text{Dumb-bell } 10' = (t_1, A) * (t_2 * B) * (t_3(C + D + E))$$

where "*" is the mathematical union operator, "+" is the mathematical intersect operator, A, B, C, D and E are the mathematical expressions for the sphere A of FIG. 1A centered at the point 'a', the sphere B of FIG. 1A centered at the point 'b', the infinite cylinder C, the half-space D to the right of the line 12 and the half-space E to the left of the line 14 and wherein $t_1$ and $t_2$ are translation operators and $t_3$ is a bending operator.

Figure 2B:
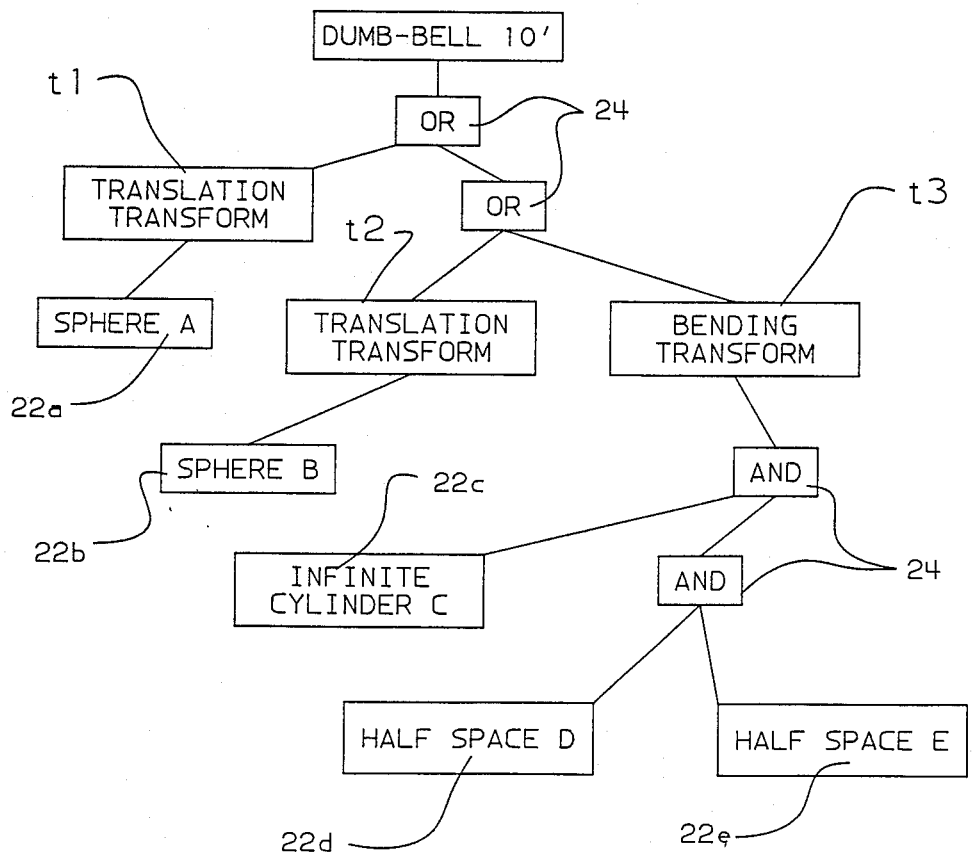

In accordance with the principles of the present invention the primitive and the combinational operator definitions are included in a structure defining the object. This structure could take the form of a tree-shaped structure such as is shown in FIG. 2B. One practical implementation of this structure could take the form of a linked-list structure with different storage element types in the structure identifying whether an element defines primitive, a combinational operator or a transform operator. Object definition storage 72 is provided for the structure forming the object definition. In the following it is assumed that the object is defined in terms of a linked-list tree structure.

World space definition storage 54 is also provided for a functional definition of the box representing world space. Usually the box will be rectangular. It could, however, take any other suitable shape, e.g. that of a cylinder. The functional definition could also take any suitable form. One possibility would be a tree structure in the form of a linked list. The definition of a rectangular box could then take the form of the intersection of six planar half-spaces. Another possibility, for a cube, would be to identify the center of the cube and the vector from that center to one corner of the cube. In the following it is assumed that the test-box is rectangular.

The control logic 58 causes the box/sub-box definition logic 60 to select the rectangular box for comparison against the object. The transform determination and object simplification logic 68 is used to generate a simplified functional definition in the case where the object to be transformed is formed from a plurality of primitives. After one or more sub-divisions of the rectangular box, the output of the comparison logic may show that a test-cell based on a transformed sub-division of the rectangular box does not intersect one or more of the primitives in the object. In this case, on further sub-divisions of that region of the rectangular box, the functional definitions of these primitives need not be compared against the test-cells for that sub-divided region. The object simplification logic selects those parts of the functional definition of the whole object which are relevant at any stage dependent on the results of previous comparison operations. Then the object simplification logic 68 is caused to select the primitives for comparison against the transforms of the box or sub-box currently selected. For each primitive so selected the transform determination and object simplification logic also identifies the transform operation(s) which would be needed to transform that primitive into world space to create the object. The inverse of each of the transforms so indicated is then identified in the transform operator storage 56.

The box or sub-box currently selected is then subjected to the or each inverse transform operator in the inverse transform processing logic 62 and a test box is generated. The resulting test-box can then either be passed by the test-cell generation logic 64 directly to the comparison logic 66 as the test-cell, or, as will be described later, a simplified test-cell can be generated from the inverse transform of the rectangular box (or sub-box) by that logic 64 and this passed to the comparison logic 66.

The object and the test-cell functional definitions are tested for intersection by being compared in the comparison logic 66 and an essentially three-valued Boolean comparison output is generated as described earlier—i.e. FULL, EMPTY or partly filled. The output of the comparison logic is passed to the control logic 58 and to the transform determination and object simplification logic 68.

Figure 2C:
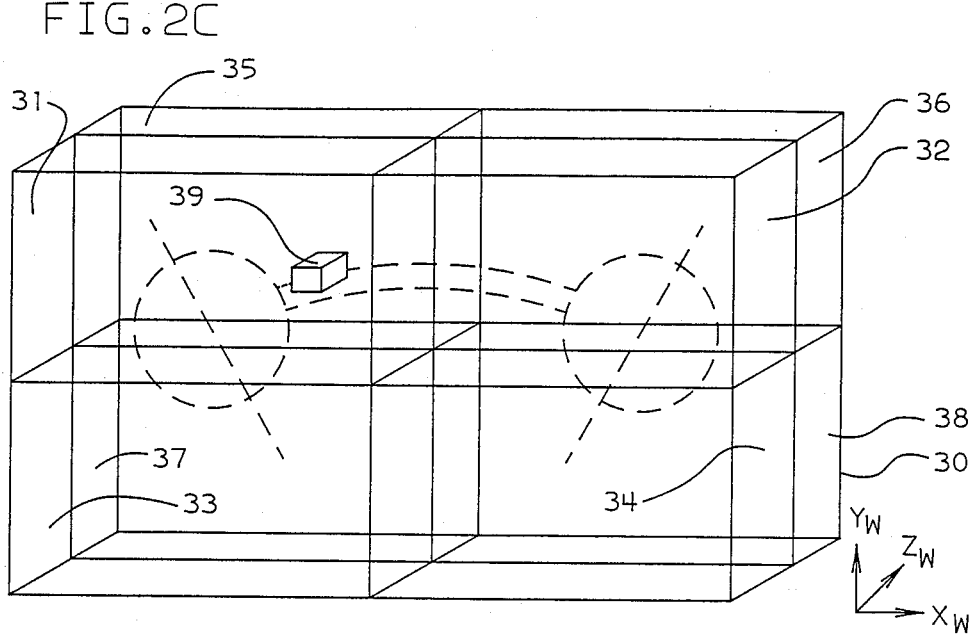

The control logic reacts in one of a number of ways dependent on the result of the comparison for each test-cell and primitive:

1. In the case where an intersection is detected and the box or sub-box under consideration is larger than a desired resolution, then the control logic causes the box/sub-box subdivision logic to divide the box or sub-box under consideration into a number of smaller sub-boxes for evaluation in order in the next stage. FIG. 2C shows the sub-division by eight, although another factor, e.g. 2, could be chosen.

2. In the case where an intersection is detected and the size of the box or sub-box under consideration corresponds to the desired resolution, then this fact is stored in the result storage 70.

3. If there is no intersection, then examination of the box or sub-box under consideration is terminated and this fact is recorded.

Figure 2D:
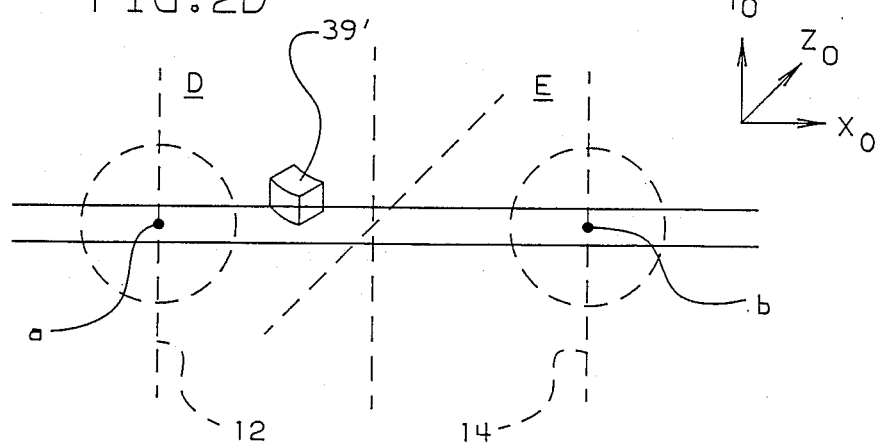

FIGS. 2C and 2D illustrate the principles of the present invention. Instead of transforming the component primitives (e.g. the cylinder C and the two half-spaces D and E) into world space as is illustrated in dotted lines in FIG. 2C, the functional definitions of the component primitives are retained in their original co-ordinate systems and space is transformed instead. Thus, a region of space 39 in world space is transformed using the inverse of the bending transform $t_3$ identified in the tree structure shown in FIG. 2B to generate a test-cell 39' in the co-ordinate system of the cylinder C for comparison against that cylinder. For comparison of a region of world space against the sphere A or B a different transform ($t_1$ or $t_2$ respectively) would be performed on the space because these spheres have merely been displaced (from a to a' or from b to b' respectively) for the dumbbell 10', and not bent.

The test-cells can be formed by the functional definitions of the inverse transforms of the sub-boxes. This is not, however, essential. The inverse transform of a sub-box could instead be replaced by a simple 3-D volume centered on and circumscribing that inverse transform. By a simple 3-D volume is meant a volume such as a sphere, rectangular boxes or an ellipsoid which is relatively easy to define and to process. This is because any part of the object which intersects the inverse transform of the sub-box will also intersect the circumscribing sphere or rectangular box or ellipsoid centered on that transform. If a simplified test-cell is used—this would be generated by the test-cell generation logic 64—the effect on the method would only be that it may be necessary to introduce a further stage of sub-division in order to achieve the same resolution as would be achieved with the inverse transform itself (i.e. the "test-box") as the test-cell. To minimize the degree of mismatch between the test-box and the test-cell used, a test cell should be chosen which has a functional definition which is easy to process, but nevertheless approximates the shape and size of the test-box.

The actual information stored in the results storage 70 performed.

If a mass calculation is being performed, the mass could simply be accumulated as a sum of the number of full cells detected, with partly full cells, corresponding to sub-boxes of the "desired resolution", being recorded as half-full.

If, for example, a 2-D image of the complex object is being generated, a pixel map of the image can be built up in the result storage. Conveniently, a rectangular box can be arranged with respect to the intended viewing (or projection) point such that one of its axes is parallel to the viewing direction, and the sub-division processes is arranged to examine rows of sub-boxes parallel to that viewing direction in making up the image. The front surface of the box, that is the surface nearest to the viewing, or projection point for the image can then form the viewing plane for that image. Each pixel on the image can then be arranged to correspond to a row of sub-boxes having a frontal area corresponding to the size of a pixel parallel to the viewing direction. This arrangement is not, however, essential, and other shapes and orientations of box are possible, particularly if it is desired to generate unusual views (distortions, stereo views etc.) of the object. The control logic will be arranged to cause sub-boxes which are nearer to the front of the object, as seen in the intended image, (i.e. nearest to the viewing plane) to be processed before those further away, so that the front surfaces of the object may be determined. Thus, a sub-box need not be considered if the settings for the corresponding pixels have already been determined. The control program maintains a record of the progress of the sub-division process. This record could be in the form of a tree-structured record, a bit-map or any other suitable form.

When the front surface of the object has been detected, the required color and/or intensity of the pixel concerned can be determined using, for example, a ray-tracing technique. The vector representing the normal to the surface of a primitive in any test-cell can be computed from the functional definition of that primitive. By transforming this normal vector into world space using the transforms identified in the object definition structure for that primitive and by comparing the transformed vector against one or more vectors representing light-sources, the color and/or intensity of the pixel corresponding to that test-cell can be determined.

In order to generate the image of a transform of the object (e.g. a two dimensional perspective view) it is merely necessary to incorporate an additional transform definition appropriate for the required transformation at the root of the structure defining the object and to consider the transform (e.g. perspective) viewing space as "world space" for the purpose of generating the image. In this way distortions of the image can be simulated and/or specialized view of the object (e.g. as through a fish-eye lens) can be produced.

For ease of illustration only relatively simple transforms and objects have been illustrated. However, it should be understood that the present invention allows objects and transforms of high complexity to be treated. Complex objects generated in accordance with the present invention from a simpler object may be combined and/or intersected with other objects in the same way as would a simple object.

In the general case, the sub-boxes which are generated from the sub-division of the box which represents world space are tested for intersection against the primitives of the object by, for each sub-box and primitive being tested for intersection, traversing the structure defining the object to the functional definition of that primitive to determine whether any transform operators are to be applied thereto and, if so, generating a test-cell in primitive space from the sub-box using the inverse of the or each transform so identified, and comparing the functional definitions of the test-cell and the primitive in primitive space to determine whether the sub-box has a corresponding test-cell which intersects the primitive.

It will be appreciated that the processing of a complex composite object involves a very large number of individual operations. However, as the individual operations involved are relatively simple, the present invention provides an efficient approach to the modelling of complex composite objects.

While the invention has been particularly shown and described with reference to a preferred embodiment thereof, it will be understood by those skilled in the art that various changes in form and detail may be made therein without departing from the spirit and the scope of the invention.

What is claimed is:

1. A method of generating a spatial representation of a three-dimensional solid object in a system comprising storage and processing means, the method comprising:
   (a) the initial step of establishing in storage
      a structure for defining the object, the structure including the functional definitions of at least one primitive and at least one transform operator; and
      a functional definition of a three-dimensional box defining world space;
   (b) followed by the step of
      subdividing the box in world space into progressively smaller sub-boxes until sub-boxes are created whose size corresponds to at least a desired resolution and
      for at least one primitive in the structure, traversing the structure to identify whether any transform operators are to be applied to the primitive as defined by the structure, and, if so, generating test-cells in primitive space from the sub-boxes using the inverse of each transform operator so identified and determining whether sub-boxes having the desired resolution have corresponding test-cells which intersect the primitive, or not,
   whereby a spatial representation of the object may be generated without performing transform operations on the object or the component primitives thereof.

2. A method according to claim 1, wherein the stucture is a tree structure with the complete solid object defined at the root node of the tree structure, primitives being defined at leaf nodes and sub-objects being defined at intermediate nodes in the tree structure and wherein transform operators and combinational functions are defined at appropriate nodes for identifying how the sub-ordinate primitives and/or sub-objects are to be combined to form the object or sub-objects at the nodes of the tree.

3. A method according to claim 1 wherein the spatial representation of the three-dimensional solid object is a two-dimensional image of that object as viewed in a viewing direction from a viewing point, said image being made up of an array of image pixels and wherein the step of determining whether sub-boxes having at least the desired resolution have corresponding test-cells which intersect the primitive or not comprises the step of
   determining, for each row of sub-boxes having a frontal area corresponding to at least a desired resolution said rows extending in the box parallel to the viewing direction and being associated with corresponding pixels in the array forming the image, which is the sub-box, if any, nearest in that row to the viewing point whose corresponding test-cell intersects the object;
and wherein the method additionally comprises the step of:
   storing the setting of the color and/or intensity for the pixel associated with respective rows appropriate to the result of the determination of the nearest sub-box for each row,
   whereby a two dimensional image of a solid object may be generated without transforming the component primitives of the object.

4. A method according to claim 3 wherein the desired resolution is the pixel resolution of the image.

5. A method according to claim 3, wherein steps (b) are recursive steps forming a plurality of stages such that, at each stage, the test-cell corresponding to the sub-box under consideration is tested for intersection and, for the case where an intersection is detected, the sub-division processes is terminated for that sub-box if its size corresponds to at least the desired resolution, otherwise the sub-box is further divided into smaller sub-boxes which are considered in turn in the next stage, whereas in the case where no intersection is detected, the sub-division process is terminated for the sub-box under consideration irrespective of its size.

6. A method according to claim 5 wherein sub-boxes nearer to the first surface of the box are considered before those further away, whereby a sub-box need not be processed where the settings for the corresponding pixels have already been determined.

7. A method according to claim 1 wherein the step of generating a test-cell comprises the step of determining a predetermined point of the transform of the box or sub-box under consideration and defining a simple 3-D volume in primitive space about said point which fully contains the transform of the box or sub-box, said volume then forming the test-cell for the box or sub-box under consideration.

8. A method according to claim 3 wherein the step of storing an indication of the color and/or intensity for the pixel associated with each row comprises the steps of transforming a vector representing a normal to the surface of a primitive within a test cell into world space and comparing the transformed surface normal vector with at least one vector representing a light source.

9. A method of generating a spatial representation of a three-dimensional solid object in a system comprising storage and processing means, the method comprising:
   (a) the initial step of establishing in storage
      a structure for defining the object, the structure including the functional definitions of a plurality of primitives and a plurality of transform operators; and
      a functional definition of a three-dimensional box defining world space;
   (b) followed by the step of
      subdividing the box in world space into progressively smaller sub-boxes until sub-boxes are created whose size corresponds to at least a desired resolution and for a given sub-box and a given primitive in the structure traversing the structure to that primitive to identify whether any transform operators are to be applied thereto as defined by the structure, and, if so, generating a test-cell in primitive space from the given sub-box using the inverse of each transform operator so identified and determining whether the sub-box has a corresponding test-cell which intersects the primitive, whereby a spatial representation of the object may be generated without performing transform operations on the object or the component primitives thereof.

10. A solid modelling system comprising means for generating a spatial representation of a three-dimensional solid object, said means for generating a functional representation of the transform of the object including:

object definition means for storing a structure defining the object, the structure including at least one primitive and at least one transform operator;

world space definition means for storing a functional definition of a three-dimensional box defining world space; and processing means for subdividing the box in world space into progressively smaller sub-boxes until sub-boxes are created whose size corresponds to at least a desired resolution, and for at least one primitive in the structure, for traversing the structure to determine whether any transform operators are to be applied to the primitive as defined by the structure and, if so, for generating test-cells in primitive space from sub-boxes using the inverse of each transform operator so identified, and for determining whether sub-boxes having the desired resolution have corresponding test-cells which intersect the primitive, or not.

* * * * *